(12) United States Patent
Goss et al.

(10) Patent No.: US 11,003,580 B1
(45) Date of Patent: May 11, 2021

(54) MANAGING OVERLAPPING READS AND WRITES IN A DATA CACHE

(71) Applicant: Seagate TEchnology LLC, Fremont, CA (US)

(72) Inventors: Ryan James Goss, Prior Lake, MN (US); Daniel John Benjamin, Savage, MN (US); David W. Claude, Loveland, CO (US); Graham David Ferris, Savage, MN (US); Ryan Charles Weidemann, Victoria, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/929,407

(22) Filed: Apr. 30, 2020

(51) Int. Cl.
G06F 13/00 (2006.01)
G06F 12/0804 (2016.01)
G06F 12/0875 (2016.01)

(52) U.S. Cl.
CPC ...... *G06F 12/0804* (2013.01); *G06F 12/0875* (2013.01); *G06F 2212/452* (2013.01)

(58) Field of Classification Search
CPC ............. G06F 12/0804; G06F 12/0875; G06F 2212/452
See application file for complete search history.

(56) References Cited

U.S. PATENT DOCUMENTS

| | | | |
|---|---|---|---|
| 4,995,041 A | 2/1991 | Hetherington et al. | |
| 5,317,720 A | 5/1994 | Stamm et al. | |
| 5,778,426 A * | 7/1998 | DeKoning | G06F 11/1076 711/122 |
| 8,413,132 B2 * | 4/2013 | Rabeler | G06F 8/654 717/169 |
| 9,223,713 B2 | 12/2015 | Pan | |
| 2003/0212865 A1 * | 11/2003 | Hicken | G06F 12/0804 711/135 |
| 2004/0003172 A1 * | 1/2004 | Su | G06F 3/061 711/112 |
| 2011/0167203 A1 * | 7/2011 | Yoshida | G06F 12/0866 711/103 |
| 2012/0159016 A1 * | 6/2012 | Morita | G06F 13/1673 710/33 |
| 2013/0019066 A1 * | 1/2013 | Tsukishiro | G06F 12/0804 711/143 |
| 2020/0050366 A1 * | 2/2020 | Bavishi | G06F 3/0604 |

\* cited by examiner

*Primary Examiner* — Jing-Yih Shyu
(74) *Attorney, Agent, or Firm* — Hall Estill Attorneys at Law (57) ABSTRACT

Method and apparatus for managing data in a storage device, such as a solid-state drive (SSD). In some embodiments, write and read commands from a client device are placed into a command queue pending servicing to transfer data between the client device and a non-volatile memory (NVM). A write cache temporarily stores sets of writeback data pending transfer. A cache manager detects an overlap condition in which a subsequently received command at least partially overlaps a pending write command. In response, the cache manager enacts a change in caching policy that includes retention of the cached writeback data to aid in the servicing of the subsequently received command. The changes in caching policy can include an increase in the size of the write cache, delays in the writing of hot writeback data sets, the coalescing of different writeback data sets, cache hits using the cached writeback data, etc.

20 Claims, 5 Drawing Sheets

DATA FLOW

FIG. 4

METADATA (MAP) FORMAT

MANAGING OVERLAPPING READS AND WRITES IN A DATA CACHE

SUMMARY

Various embodiments of the present disclosure are generally directed to a method and apparatus for enhancing performance of a storage device, such as a solid-state drive (SSD).

In some embodiments, access commands received from a client device are placed into a command queue. The access commands include write commands to write sets of writeback data to a non-volatile memory (NVM) and read commands to read sets of readback data from the NVM. Sets of writeback data associated with the write commands are temporarily stored in a write cache pending transfer to the NVM. The access commands are monitored to detect an overlap condition in which a subsequently received access command requests a retrieval from or a transfer to the NVM of a set of data having a logical range that at least partially overlaps a logical range of a selected set of writeback data currently pending in the write cache. In response to the detected overlap condition, a caching policy associated with the write cache is adjusted. The adjustment includes retention of the selected set of writeback data in the write cache after the selected set of writeback data have been successfully transferred to the NVM. The retained selected set of writeback data in the write cache are used to service the subsequently received access command.

These and other features and advantages which characterize the various embodiments of the present disclosure can be understood in view of the following detailed discussion and the accompanying drawings.

DETAILED DESCRIPTION

The present disclosure generally relates to the management of data transfer commands in a data storage device, such as but not limited to a solid-state drive (SSD).

Storage devices generally include a controller and non-volatile memory (NVM). The controller communicates with a host (client) device to manage the storage and retrieval of user data to and from the NVM. Solid-state drives (SSDs) are one form of storage device that use solid-state semiconductor memory, such as NAND flash, to store the user data. The flash is often arranged as a number of flash semiconductor dies that are accessible via channels (lanes).

SSDs are configured to write data to and read data from the flash (or other NVM) based on client write and read commands issued by one or more client devices. Because NAND flash is an erasable memory, it is generally necessary to update map metadata that identifies the locations of the latest versions of the data that have been written to the flash.

A write cache can be used to temporarily store sets of write data prior to being transferred to flash. These types of data are referred to as "dirty data" or "writeback data". A read buffer can be used to accumulate read data that have been retrieved from flash prior to the transfer of the data to the requesting client. These types of data are referred to as "retrieved data" or "readback data."

SSDs and other storage devices can be configured to receive, queue and service pending access commands from various hosts. For example, devices configured in accordance with the NVMe (Non-Volatile Memory Express) standard can accommodate queue depths of many thousands of pending commands. It is important to track the various read and write commands and ensure the commands are executed in a suitable order so that the correct versions of data are written to the flash and read back to the requesting clients.

From time to time, multiple access commands will be received that conflict, or overlap, a logical range of data blocks that are currently being processed by the storage device. These conditions are referred to as "overlapping reads" and "overlapping writes."

An overlapping read condition occurs when a read command is received for a set of writeback data in the write cache that has not yet been transferred to the flash memory. Because the latest version of the data has not yet been written to the flash, it would be inappropriate to satisfy the read command using the flash since the flash stores an older version of the data.

One way to resolve an overlapping read is to wait until the cached writeback data are successfully transferred to the flash to complete the write command, after which the requested readback data are retrieved from the flash to complete the read command. This is sometimes referred to as an atomic write scheme, since it forces the commands to be executed to completion in sequence. An alternative way to handle an overlapping read is to proceed with the write operation, but to concurrently service the read command by reading the data out of the write cache. This is sometimes referred to as a cache hit scheme. Both of these schemes have respective advantages and disadvantages.

An overlapping write condition occurs when an older version of writeback data is still pending in the write cache when a newer, updated set of the writeback data is received. If the respective write commands cover the same range of blocks and the transfer of the writeback data to the flash memory has not yet begun, it may be possible to cancel the writing of the older set of data and write the newer set of data instead. This saves the need to perform an unnecessary write operation, provided there are no intervening read commands requesting that older version of data (e.g., an overlapping read is not present). However, if the transfer of the older version of the writeback data to flash has already begun when the newer set of writeback data is received, most current systems implement an atomic write so that the ongoing write operation is completed, after which the new writeback data set is written to the flash to supersede the older version. While operable, this approach has certain disadvantages including the need for multiple writes, map updates, and intervening reads.

Various embodiments of the present disclosure are accordingly directed to an apparatus and method for enhancing performance of a data storage device through the intelligent management of overlapping client access commands.

As explained below, some embodiments provide a data storage device with a non-volatile memory (NVM), a controller and a cache manager. The NVM may take the form of a flash memory. The controller may be realized in hardware and/or firmware using hardware and/or programmable processor circuitry. The cache manager may be incorporated as part of the controller functionality or may be a separate circuit, and includes an overlapping read monitor, an overlapping write monitor, and a command manager.

During normal operation, the controller processes access commands (e.g., read and write commands) from a client to transfer user data sets between the client and the NVM. The access commands are accumulated in one or more command queues, and are scheduled for execution in an appropriate sequence. Writeback data sets pending transfer to the NVM are temporarily stored in a write cache, and readback data sets that have been retrieved from the NVM are temporarily stored in a read buffer.

The cache manager monitors for the occurrence of read and write overlapping conditions during the servicing of the various access commands. When a sufficient frequency and occurrence rate of overlapping conditions are experienced, the cache manager implements a temporary change in a caching policy. The caching policy modifies the configuration and use of the write cache, as well as other aspects of the system as required such as the read buffer, etc.

The change in caching policy can take a number of forms. In some cases, multiple adjustments to the caching policy are concurrently made. Examples include a change in cache size, an increase in retention time for the cached writeback data sets (including delaying the writing of certain sets to flash, and the retention of other sets that have already been forwarded to the flash), the coalescing of multiple data sets, the reordering of read and write sequences, speculative readbacks to the read buffer, and so on. Overlapping conditions continue to be monitored for and further adjustments are implemented as required. The caching policy may subsequently return to a normal baseline state if the rate of occurrence of subsequent overlapping conditions returns to a baseline rate.

In this way, the in-transit data sets in the write cache and read buffer can be intelligently managed to maintain client I/O data transfer rate performance at an acceptable level. It is contemplated that the disclosed scheme can be implemented in substantially any data storage environment, including but not limited to solid-state drives (SSDs), hard disc drives (HDDs), hybrid drives, multi-device arrays having multiple storage devices, etc.

Figure 1:
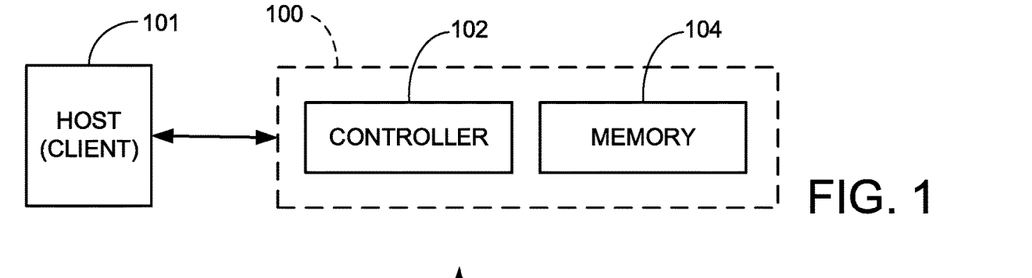
FIG. 1 provides a functional block representation of a data storage device constructed and operated in accordance with various embodiments of the present disclosure.

These and other features and advantages of various embodiments can be understood beginning with a review of FIG. 1 which provides a functional block representation of a data storage device 100. The storage device is coupled to a host (client) device 101.

The device 100 includes a controller 102 which provides top-level control and communication functions for the client 101, and a memory module 104 which provides non-volatile memory (NVM) for the storage of user data from the client. The controller 102 may be a programmable CPU processor that operates in conjunction with programming stored in a computer memory within the device. The controller may alternatively be a hardware controller. The controller may be a separate circuit or the controller functionality may be incorporated directly into the memory array 104.

As used herein, the term controller and the like will be broadly understood as an integrated circuit (IC) device or a group of interconnected IC devices that utilize a number of fundamental circuit elements such as but not limited to transistors, diodes, capacitors, resistors, inductors, waveguides, circuit paths, planes, printed circuit boards, memory elements, etc. to provide a functional circuit regardless whether the circuit is programmable or not. The controller may be arranged as a system on chip (SOC) IC device, a programmable processor, a state machine, a hardware circuit, a portion of a read channel in a memory module, etc. The term memory and the like will be broadly understood as incorporating volatile and/or non-volatile memory, including rotatable media, solid-state semiconductor memory, etc.

Figure 2:
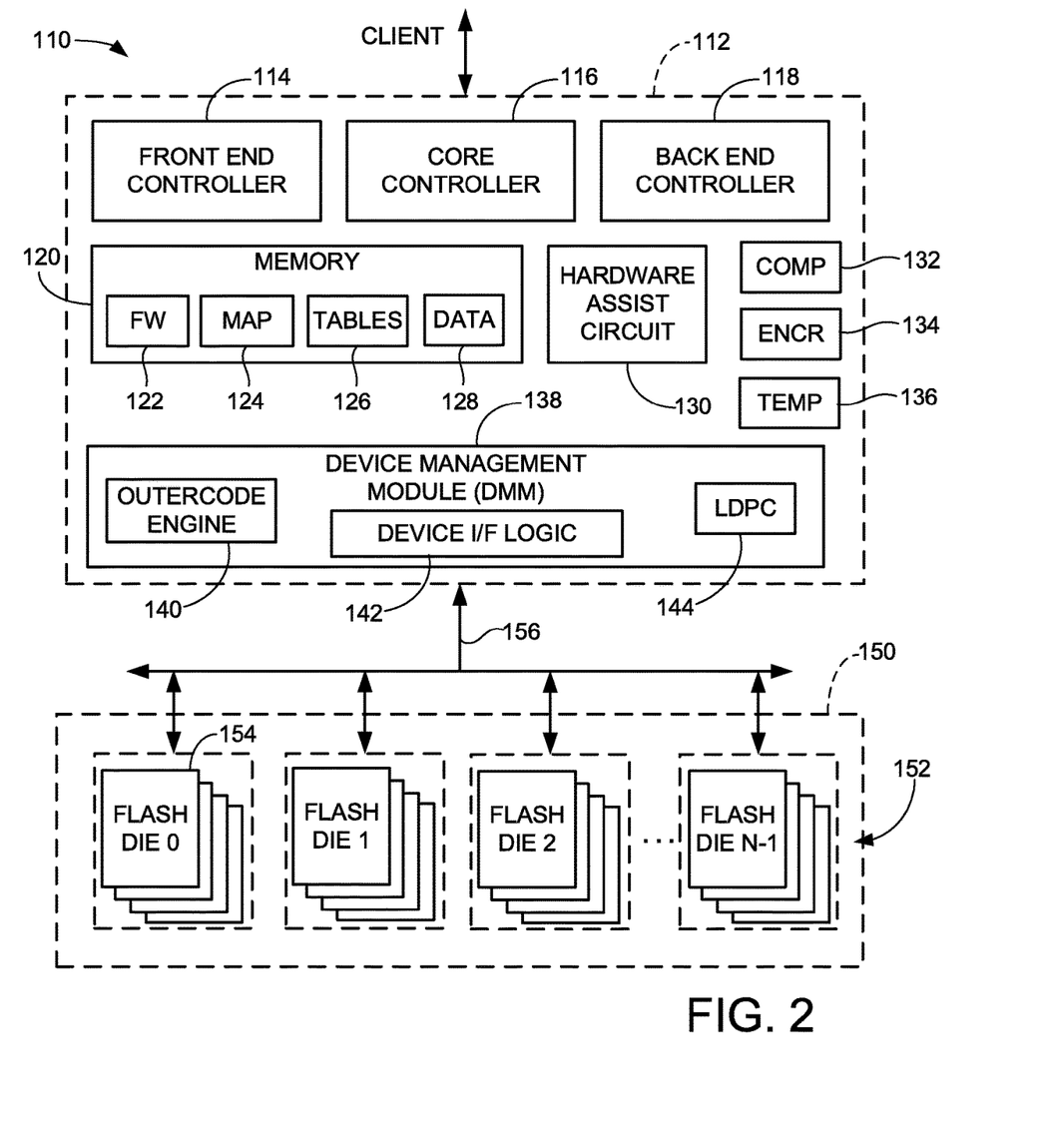
FIG. 2 illustrates the device of FIG. 1 characterized as a solid-state drive (SSD) in accordance with some embodiments.

In order to provide a detailed explanation of various embodiments, FIG. 2 describes relevant aspects of an exemplary data storage device 110 corresponding to the device 100 of FIG. 1. The device 110 is shown in FIG. 2 to be configured as a solid-state drive (SSD) that communicates with one or more client devices via one or more Peripheral Component interface Express (PCIe) ports. The NVM is contemplated as comprising 3D NAND flash memory, although other forms of memory can be used.

In at least some embodiments, the SSD operates in accordance with the NVMe (Non-Volatile Memory Express) specification, which enables different users to allocate NVM sets (die sets) for use in the storage of data. Each die set may form a portion of an NVMe namespace that may span multiple SSDs or be contained within a single SSD. Each NVMe namespace will be owned and controlled by a different user (owner). While aspects of various embodiments are particularly applicable to devices operated in accordance with the NVMe standard, such is not necessarily required.

The SSD 110 includes a controller circuit 112 with a front end controller 114 a core controller 116 and a back end controller 118. The front end controller 114 performs host OF functions, the back end controller 118 directs data transfers with the memory module 104-144 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including loaded firmware (FW) 122, map data 124, table data 126 and user data 128 in read/write buffers temporarily cached during host data transfers.

A non-processor based hardware assist circuit 130 may enable the offloading of certain memory management tasks by one or more of the controllers as required. The hardware assist circuit 130 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in or adjacent the controller 112, such as a data compression block 132, an encryption block 134 and a temperature sensor block 136. These elements can be realized using hardware/firmware as required. The data compression block 132 applies lossless data compression to input data sets during write operations to enhance storage efficiency. It is contemplated albeit not required that all of the user data supplied for storage by the SSD 110 will be compressed prior to storage to the flash memory.

The encryption block 134 applies suitable compression and other cryptographic processing to provide data security for the SSD. The temperature sensors block 136 may include one or more temperature sensors that monitor and record temperatures of the SSD during operation.

A device management module (DMM) 138 supports back end processing operations and may include an outer code engine circuit 140 to generate outer code, a device OF logic circuit 142 and a low density parity check (LDPC) circuit 144 configured to generate and use LDPC codes as part of an error detection and correction strategy to protect the data stored by the SSD 110.

A memory module 150 corresponds to the memory 104 in FIG. 1 and includes a non-volatile memory (NVM) in the form of a flash memory 152 distributed across a plural number N of flash memory dies 154. Flash memory control electronics (not separately shown in FIG. 2) may be provisioned to facilitate parallel data transfer operations via a number of channels (lanes) 156.

Figure 3:
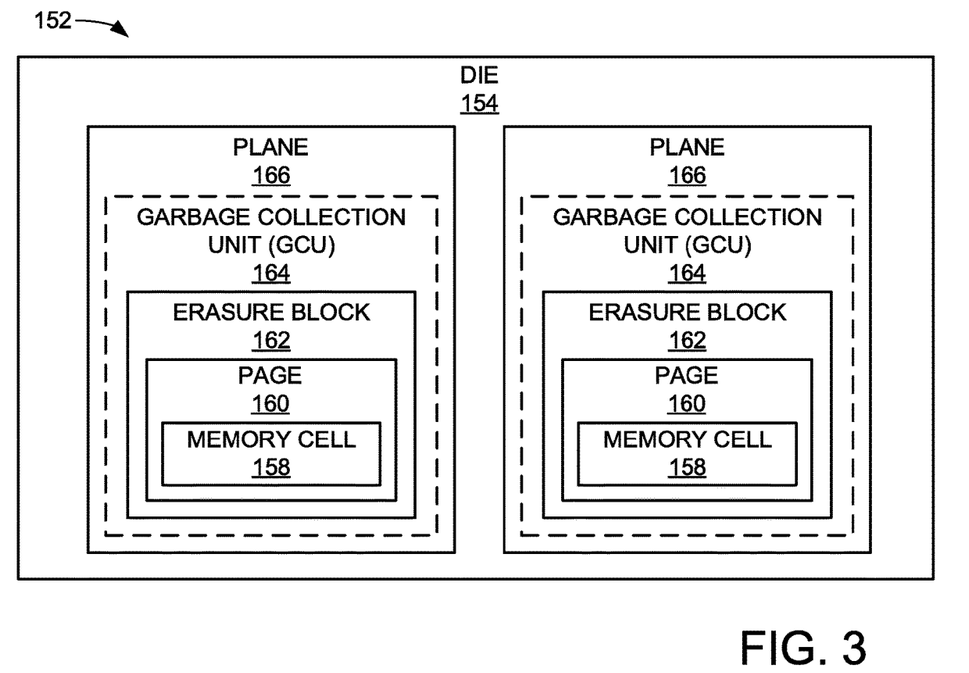
FIG. 3 shows a physical and logical layout of a flash die from FIG. 2 in some embodiments.

FIG. 3 shows a physical/logical arrangement of the various flash memory dies 154 in the flash memory 152 of FIG. 2 in some embodiments. Each die 154 incorporates a large number of flash memory cells 158. The cells may be arrayed in a two-dimensional (2D) or three-dimensional (3D stacked) arrangement with various control lines (e.g., source, bit, word lines) to access the cells.

Groups of cells 158 are interconnected to a common word line to accommodate pages 160, which represent the smallest unit of data that can be accessed at a time. Depending on the storage scheme, one or more pages of data may be written to the same physical row of cells, such as in the case of SLCs (single level cells with one bit per cell), MLCs (multi-level cells with two bits per cell), TLCs (three-level cells with three bits per cell), 4LCs (four-level cells with four bits per cell), and so on. Generally, n bits of data can be stored to a particular memory cell 158 using $2^n$ different charge states (e.g., TLCs use eight distinct charge levels to represent three bits of data, 4LCs use sixteen distinct charge levels to represent four bits of data, etc.). The storage size of a page can vary; some current generation flash memory pages are arranged to store 32 KB (32,768 bytes) of user data plus associated LDPC code bits.

The memory cells 158 associated with a number of pages are integrated into an erasure block 162, which represents the smallest grouping of memory cells that can be concurrently erased in a NAND flash memory. A number of erasure blocks 162 are turn incorporated into a garbage collection unit (GCU) 164, which are logical storage units that utilize erasure blocks across different dies and which are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location (e.g., a new GCU), followed by an erasure operation to reset the memory cells to an erased (unprogrammed) state. The recycled GCU is returned to an allocation pool for subsequent allocation to begin storing new user data. In one embodiment, each GCU 164 nominally uses a single erasure block 162 from each of a plurality of dies 154, such as 32 dies.

Each die 154 may further be organized as a plurality of planes 166. Examples include two planes per die as shown in FIG. 3, although other numbers of planes per die, such as four or eight planes per die can be used. Generally, a plane is a subdivision of the die 154 arranged with separate read/write/erase circuitry such that a given type of access operation (such as a write operation, etc.) can be carried out simultaneously by each of the planes to a common page address within the respective planes.

Figure 4:
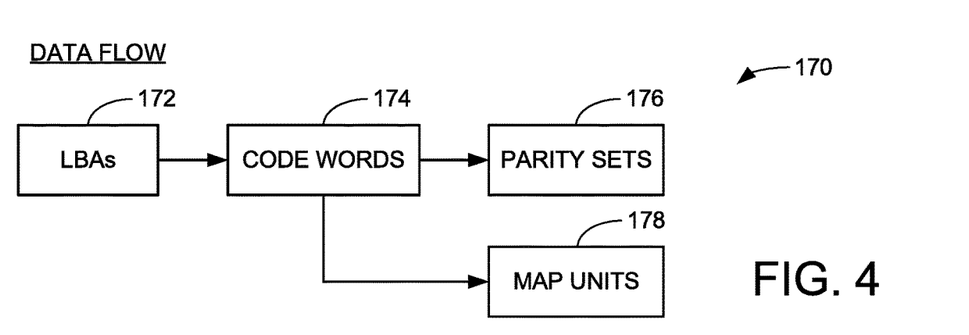
FIG. 4 illustrates a data flow for data stored by the SSD.

Input data from a client device such as 101 are processed in a manner such as illustrated by a data flow sequence 170 in FIG. 4. Other arrangements can be used. Blocks of data with associated logical addresses are presented at 172. The logical addresses may be logical block addresses (LBAs), but other forms can be used including key values, virtual block addresses, etc. The blocks are arranged into code words 174, which include user data bits and error correction code (ECC) bits to facilitate recovery during a read operation. The ECC bits may take the form of LDPC (low density parity check) bits.

A selected number of the code words may be arranged into pages, and a selected number of pages may in turn be arranged into parity sets 176. In one non-limiting example, 31 pages of code words are combinatorially combined to generate a parity value as a $32^{nd}$ page, and then all 32 pages of the parity set is written to a selected GCU. The parity value operates as outer code. Using a GCU size of 32 erasure blocks with one erasure block from each die, the outer code can facilitate data recovery even in the instance of a single die failure.

For mapping purposes, groups of the code words 174 are further arranged into map units 178. Map units represents groupings that enable the mapping system of the SSD to locate and retrieve the code words stored to the flash memory.

Figure 5:
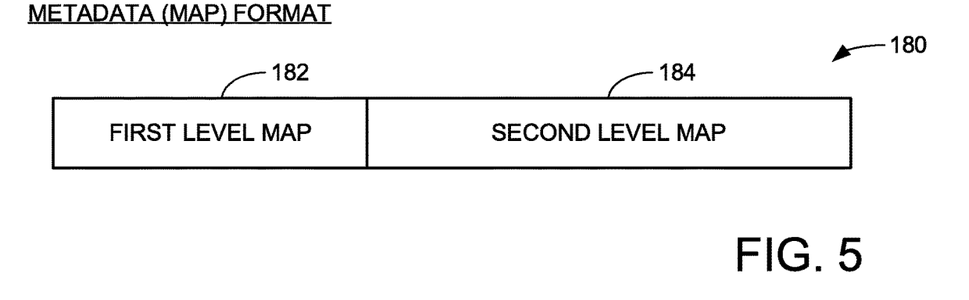
FIG. 5 is a format for map metadata used by the SSD.

A two level map 180 is represented in FIG. 5. Other mapping structures can be used including a single level map, a multi-level map with more than two levels, etc. The map 180 includes a first level map 182 and a second level map 184. The second level map 184 operates as a flash transition layer (FTL) with a physical to logical association of addresses to enable location of the desired user data blocks. The first level map 182 generally indicates the locations of map descriptors that in turn identify the locations of the map units 178 in the second level map 184. Some, most or all of the first and second level maps 182, 184 may be loaded to local memory for use by the controller 112.

A typical data access sequence to service a client data transfer command may include accessing the first level map to identify the appropriate entry in the second level map, and accessing the second level map to identify the location in flash where the associated user data blocks are located. In the case of a read operation, the user data blocks are retrieved for further processing and return to the requesting client; in the case of a write operation, the new data blocks are written to a new location, and the metadata is updated. Maintaining accurate map metadata is generally necessary to enable the SSD 110 to accurately identify the current state of the system, and reliably service client access commands. Protection schemes such as error correction coding, redundant copies, etc. are applied to ensure the integrity of the map data.

Figure 6:
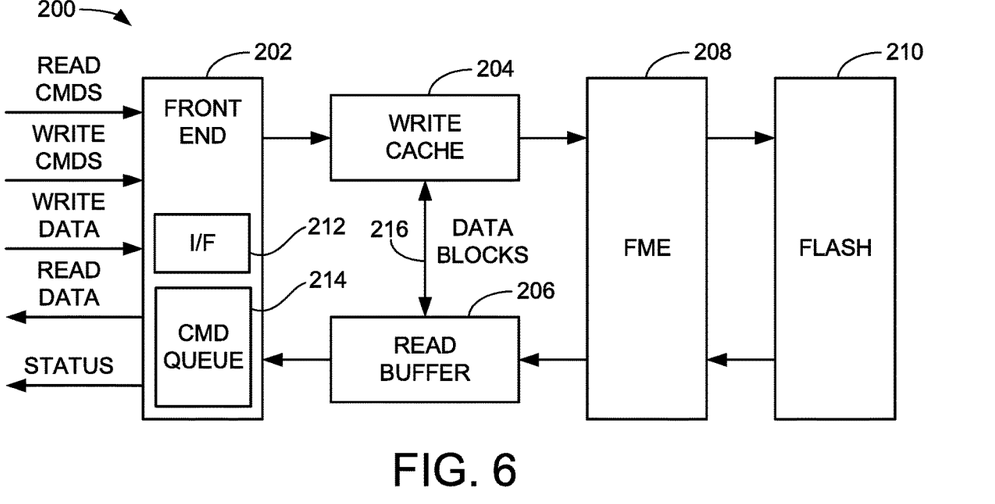
FIG. 6 depicts data paths through the SSD during the servicing of client access (read and write) commands in some embodiments.

FIG. 6 is a functional block representation of data path circuitry 200 of the SSD 110 in accordance with some embodiments. The circuitry 200 includes a front end 202, a write cache 204, a read buffer 206, flash memory electronics (FME) 208, and flash memory 210. The front end 202 interfaces with one or more client devices 101 (FIG. 1) using an interface (I/F) circuit 212. Pending access commands are stored in one or more command queues 214.

During normal operation of the SSD 110, the client(s) will issue various access commands including read and write commands. Each read command will constitute a request for some logical range (e.g., LBA range) of blocks to be retrieved from flash 210. Each write command will constitute a request to store some logical range of blocks to the flash, and will be accompanied by a transfer of the associated writeback data.

The front end 202 processes these and other commands and arranges the respective read and write commands into one or more of the command queues 214 pending execution. The writeback data are stored in the write cache 204 and are subjected to processing as described above in FIG. 4 to arrange the writeback data into code words, pages, parity sets, etc. Additional processing may be applied as well, such as encryption and compression.

At such time that a command scheduler (not separately shown) of the controller 112 selects the next command to be serviced, the associated command/data are forwarded to the FME 208, which in turn directs the same to the flash 210. In the case of a write command, the writeback data are written to the next set of available pages 160 in an allocated GCU 164 (FIG. 3). In the case of a read command, the data are retrieved, subjected to error correction and other signal processing steps, and placed in the read buffer. The map metadata are accessed and updated as required during these operations.

Client read commands tend to receive priority over other commands, including client write commands and background commands, on the basis that the client is likely waiting for the requested readback data before it can proceed with subsequent processing steps. At the same time, the command scheduler function of the controller needs to execute the background operations (e.g., garbage collection, map updates, calibrations, etc.) at a sufficient rate to enable the storage device to continue to service the client access commands at acceptable performance levels. Another complicating factor is that the various competing pending commands and background operations may require the use of shared resources that have to be made available before the next command or operation can be carried out. These resources can include, without limitation, data buffers, decoders, encryption/decryption circuitry, lanes, dies, registers, map data, etc.

Continuing with FIG. 6, the front end 202 provides various statuses to the client, including command complete statuses when commands are completed. For completed read commands, the command complete status may indicate that the requested readback data have been successfully retrieved and are now available for transfer from the read buffer 206. If writeback caching techniques are employed, the front end 202 may proceed to issue a write command complete status to the client, even if the writeback data are still pending in the write cache 204 and have not yet been written to the flash 210. To this end, the write cache 204 may take the form of NVM, such as NAND or NOR flash, although such is not necessarily required. The read buffer 206 may normally be volatile memory, such as DRAM, since the readback data in the read buffer can always be re-read from the non-volatile flash if required.

Finally, as explained below, internal transfers of data blocks may occur at selected times between the write cache 204 and the read buffer 206. These transfers are generally depicted by arrow 216.

Figure 7:
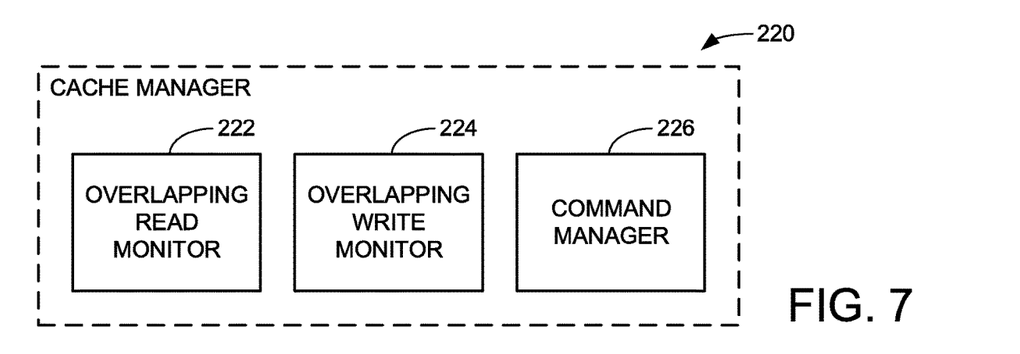
FIG. 7 is a functional block representation of a cache manager of the SSD constructed and operated to manage the data flow of FIG. 6 in various embodiments.

FIG. 7 shows a cache manager 220 of the SSD 110. The cache manager provides management of overlapping access commands in a manner explained below. The cache manager 220 may form a portion of the controller 112 (see FIG. 2), or may be a separate circuit. As such, the cache manager can be realized using hardware, firmware executed by a programmable processor, or a combination of both. It is contemplated that the cache manager is implemented as a background monitor and management circuit to support the main data flows of FIG. 6.

The cache manager 220 is shown to include an overlapping read monitor 222, an overlapping write monitor 224 and a command manager 226. Other arrangements can be used. Generally, the overlapping read monitor 222 operates to track the occurrence, frequency and rate of overlapping read conditions. As noted above, an overlapping read condition occurs when a read command is received for data still pending in the write cache 204. The read command may be for the entire logical range of the data in the write cache, or may only partially overlap the logical range for the cached data.

The overlapping write monitor 224 operates to track the occurrence, frequency and rate of overlapping write conditions. As noted above, an overlapping write condition occurs when a newer set of writeback data having a particular logical range is received while an older set of writeback data is currently present in the write cache with the same logical range, or at least a partially overlapping range, and the older set of writeback data has not yet been fully transferred to the flash. Because of the preprocessing and scheduling constraints upon the system, it is not necessarily required for a given set of writeback data to have commenced an actual transfer to the FME 208 in order for an overlapping write condition to occur. Rather, for purposes of the present discussion, receipt of a newer set of writeback data while an older set of writeback data are still pending in the write cache 204 will be considered sufficient to constitute an overlapping write condition.

Figure 8:
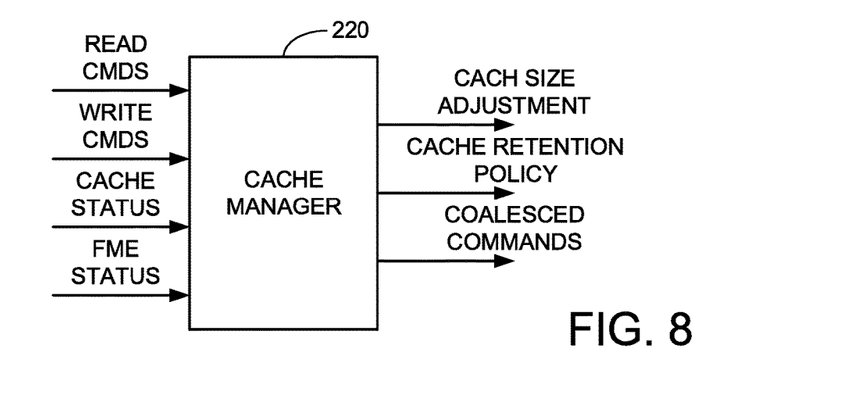
FIG. 8 illustrates various inputs and outputs of the cache manager of FIG. 7.

The command manager 226 receives inputs from the monitor circuits 222, 224 as well as other system inputs, and operates as required to implement a change in caching policy for the SSD 110 to better meet the existing operational environment. This is illustrated in FIG. 8, which shows various inputs and outputs for the cache manager 220 from FIG. 7.

Inputs to the cache manager 220 can include the various read and write commands from the various command queues 214; cache status data associated with a current status of the write cache and the read buffer; an FME status indicative of the current state of the FME, and so on. The statuses for the write cache and read buffer can include information on how full these respective memory locations are, aging statistics for the retained data, etc. Other useful inputs can be provided as well.

The changes to the caching policy enacted by the cache manager 220 can include a cache size adjustment, a change in retention constraints, and an operation to coalesce (combine) commands. Other changes can be implemented as well. It will be appreciated that the changes to the caching policy are enacted based on actual overlap conditions detected by the system, so that the changes implemented to the caching policy enable efficient servicing of the pending overlapping access commands. The change in policy also provides a mechanism to potentially enhance the servicing of future overlapping access commands that may be received in the near future.

Figure 9:
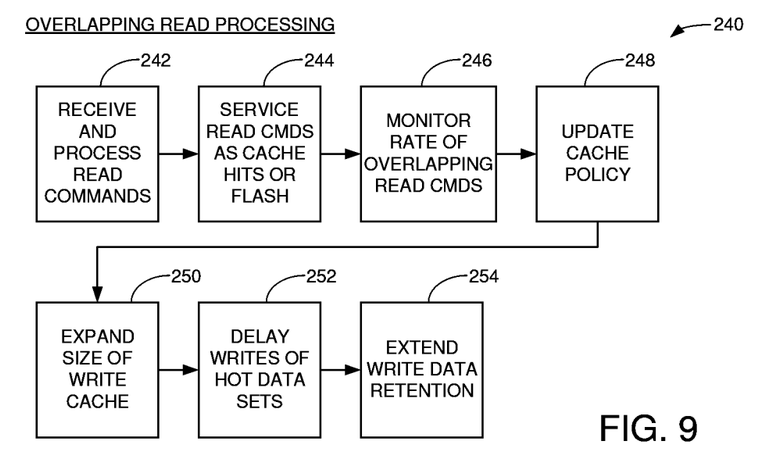
FIG. 9 is a sequence diagram to show overlapping read processing by the cache manager circuit in some embodiments.
Figure 10:
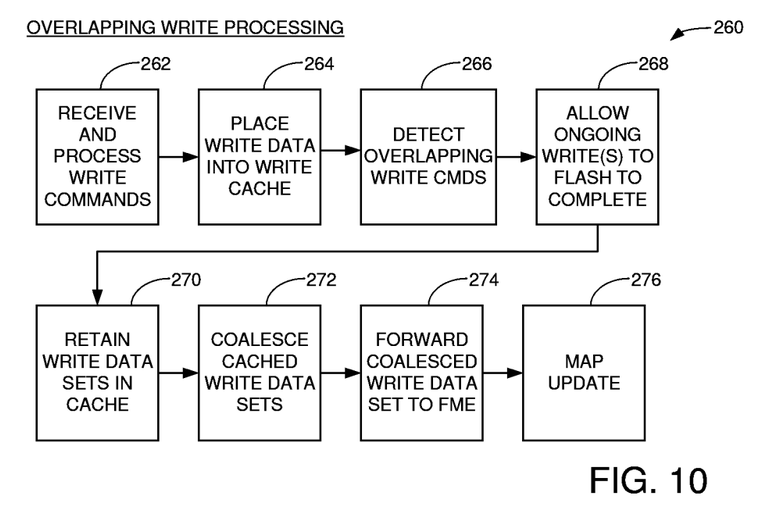
FIG. 10 is a sequence diagram to show overlapping write processing by the cache manager circuit in some embodiments.

FIGS. 9 and 10 provide respective sequence diagrams to illustrate operation of the cache manager 220 in accordance with some embodiments. It will be appreciated that these are background processes that are carried out during normal operation of the SSD.

FIG. 9 provides an overlapping read processing sequence 240. The process commences at block 242 where read commands from one or more clients are received and processed. With reference again to FIG. 6, such processing may include placement of each read command into an appropriate command queue, the retrieval and analysis of the appropriate map metadata to locate the target data in the flash, the identification of the necessary resources to carry out the command, and the scheduling of the command.

At block 244, the subsequent execution of the read commands is carried out. This may include the forwarding of the commands to the FME, the retrieval of the data from flash, processing the readback data (e.g., LDPC decoding, decryption, etc.), placement of the decoded readback data into the read buffer, and notification of the host that the data have been successfully retrieved and are now ready for transfer.

In some cases, all read commands (except as discussed below) are normally serviced from the flash independently of the state of the read buffer. This is based on the fact that the additional processing overhead needed to track and monitor the contents of the read buffer may not be worth the performance gain that could be realized through supporting read cache hits. For example, such processing overhead would need to coordinate with the write cache to make sure that the version of the requested data matches the version in the read buffer. Nevertheless, it is contemplated that in other cases, the SSD can be configured to first check for the possibility to service a read command from the read buffer as a read cache hit prior to forwarding the read command to the flash.

The rate of overlapping read commands is monitored at block 246. This is carried out during the ongoing processing of blocks 242 and 244, and is performed by the overlapping read monitor 222 of FIG. 7. The monitoring can take place in a number of ways. In some embodiments, the contents of the write cache are checked against the logical range of the blocks requested by each read command to detect the presence of an overlap. Each occurrence may be logged to a tracking data structure, along with other suitable data such as which ranges are affected, time/date stamp information, etc.

Block 248 depicts an operation by the command manager 226 (FIG. 7) to update the current cache policy. In some cases, criteria are applied to the detected overlapping reads, such as a selected number of occurrences over a predetermined timing window meeting or exceeding a first threshold, an accumulated number of overlapping reads for a selected logical range meeting or exceeding a second threshold, etc. It will be noted that the updated cache policy can apply to all data sets, or can be tailored as specialized processing applied to commands in a first range while commands in a different, second range continue to be processed normally.

Different possible changes in caching policy are represented by blocks 250, 252, and 254. Each of these can be implemented individually or in combination as required. Other changes will readily occur to the skilled artisan in view of the present disclosure and can be implemented as desired.

Block 250 provides a change in the size of the write cache, such as by increasing the available local memory available to store cached writeback data sets. As noted above, it is contemplated albeit not necessarily required that the write cache 204 (FIG. 6) is NVM, such as flash. In such case, additional available local flash memory may be made available for use to temporarily cache writeback data sets. In other embodiments, volatile memory (such as a section of DRAM, etc.) can be allocated for use, including but not limited to reallocating a portion of the read buffer for use as write cache. Other arrangements can be used. It will be understood that increasing the write cache capacity enables the storage and pendency of a greater amount of writeback data by the system. This should be balanced against the need to be able to, as required, successfully transfer all dirty writeback data in the cache to flash during a shutdown (scram) interval as the SSD is powered down.

Block 252 provides the implementation of a delay in the transfer of at least certain sets of the writeback data to the flash. These sets are referred to as hot sets having a relatively greater amount of client interest. Normally, the command scheduler function implements a timing criterion in which each pending writeback set of data in the write cache is written to flash within some reasonable period of time (e.g., 500 ms, etc.). This ensures that the data are written to flash on a regularly occurring basis, that the write cache is not filled to the point where new data sets cannot be received, etc.

Applying delay intervals to certain sets of writeback data allows at least certain of the writeback data sets to remain pending in the write cache for a period of time longer than the normal time. This can have benefits both for overlapping reads as well as overlapping writes, as explained below. It will be appreciated that if a particular set of writeback data is delayed in this fashion, other subsequently received sets of writeback data may be written to the same target location in the flash (e.g., a selected GCU, a selected die set, etc.) ahead of the delayed set; in other words, when the required resources become available such that the command scheduler would normally select the selected set, the delay overrides this selection and causes some other available set of write data to be written instead.

Expanding the size of the write cache as provided in block 250 can alleviate some of the concerns regarding greater pendency of the writeback data in the write cache. While block 252 describes selectively delaying the writes of selected data sets (e.g., hot data sets with the greatest read interest), in other cases the timing constraints regarding ultimate transfer to the flash can be relaxed for all pending data sets.

Block 254 shows an adjustment in which at least certain sets of writeback data are retained for a short period of time after the data have been successfully transferred to flash. As before, this can help with both read and write overlap conditions. While the writeback data can be retained in the write cache during this period, other local storage locations can be used including transferring the data to a portion of the read buffer or some other local memory location.

FIG. 10 provides an overlapping write processing sequence 260. The process commences at block 262 where write commands from one or more clients are received and processed. As described above, the write commands are processed as required including placement of the commands into an appropriate command queue, reference to map data and resource requirements, and so on. The associated write data to be written are placed into the write cache at block 264.

The overlapping write monitor 224 (FIG. 7) operates during these operations to detect overlapping write commands at block 266. In some embodiments, the contents of the write cache for previously received write commands are checked against the logical range of the blocks supplied by each write command to detect the presence of an overlap. As with the overlapping reads, the overlapping writes may be logged to a tracking data structure along with other suitable data.

There are limited circumstances where a newly received write command may be found to wholly supersede an existing write command; for example, if both the older set of write data and the newer set of write data encompass the exact same number and addresses of blocks from a logical addressing standpoint (e.g., both write LBAs X to Y), then it may be possible to forego the writing of the older set of write data provided there are no pending read commands for the older set. These types of checks can be carried out by the command manager 226 (FIG. 7).

However, it is presumed that it will be more common for the write commands to overlap, but not completely; that is, there may be LBAs in the first command that are not included in the second command or vice versa. For example, the first command writes LBAs X to Y while the second command writes LBAs X to Z, the first command writes LBAs W to Y and the second command writes X to Z, etc.

Accordingly, in most cases the system will proceed to allow the older version of the writeback data to be written to the flash, as indicated at block 268. This may be limited to situations where the write operation has already commenced for the older data, but this is not necessarily required.

One change in caching policy that is implemented by the command manager 226 is the temporary retention of the older version of the writeback data in the write cache, as provided at block 270. This allows the two write commands to be coalesced, as shown at block 272. The coalescing operation includes a comparison of the two data sets and a suitable merger so that required data blocks from the older data set are merged into the new data set to form a coalesced write data set. The coalesced write data set is thereafter scheduled and sent to the FME for writing at block 274, and any required metadata updates to the map structure are carried out at block 276.

Figure 11:
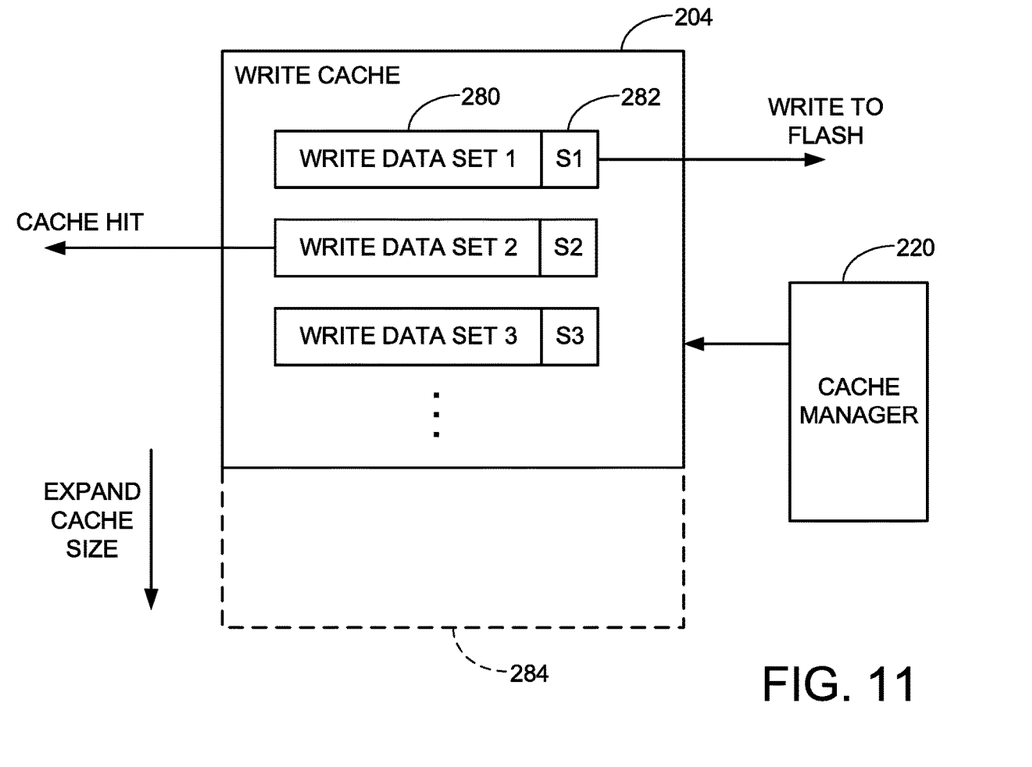
FIG. 11 illustrates aspects of the write cache during the overlapping read processing of FIG. 9.

FIG. 11 is a schematic representation of the write cache 204 during the overlap processing of FIGS. 9-10. The write cache 204 is shown to temporarily store writeback data in the form of write data sets 280. These are arbitrarily denoted as write data sets 1-3, with each data set corresponding to a different write command received from an associated client.

Each write data set 280 has corresponding tracking and control data in the form of a status value 282. The status values are denoted as S1-S3, and may be stored with the write data or in a separate table. The status values can be of any suitable bit length and can have any number of fields to record pertinent data associated with each set. The status values indicate specialized processing that may need to be carried out, an indication of the current status of the set, a retention time for the set, a linking value to another command/data set, etc.

Various changes to caching policy discussed above in FIGS. 9-10 are represented by FIG. 11. An expansion of the existing write cache size is generally indicated at 284. The first write data set (write data set 1) is shown being transferred to flash. The second data set (write data set 2) is shown servicing a read cache hit. The third write data set (write data set 3) may or may not have yet been written to flash but is being retained in the write cache to assist in the servicing of other pending or predicted overlapping access commands. The cache manager 220 can use the status fields 282 to tailor the processing for each command while not otherwise interfering with normal data flows.

Figure 12:
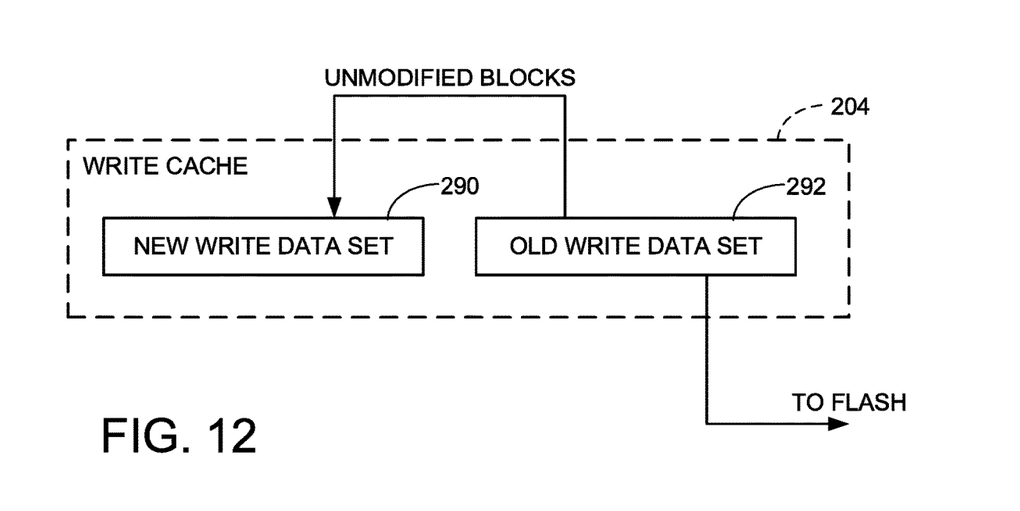
FIG. 12 illustrates aspects of the write cache during the overlapping write processing of FIG. 10.

FIG. 12 provides another representation of the write cache 204 during overlapping processing. In this example, a new write data set 290 has been added to the write cache during the pendency of an old write data set 292. The new write data set at least partially overlaps the old write data set. In this case, the old write data set 292 is forwarded to flash but is also retained to supply unmodified blocks which are incorporated into the new write data set. The blocks added from the older set 292 may include LBA values that are not included in the new write data set 290, so that the resulting coalesced write data set includes all of the new data blocks from the new set and additional blocks from the old set. Among other advantages, this eliminates the need for a subsequent read operation to read back the unmodified blocks from flash after the old data are written to support the writing of the new data.

While various embodiments presented herein have been described in the context of an SSD, it will be appreciated that the embodiments are not so limited. The various embodiments have particularly suitability for use in an NVMe environment, including one that supports deterministic (IOD) modes of operation in which specified levels of performance are guaranteed for selected intervals.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method, comprising:
  placing access commands received from a client device into a command queue, the access commands comprising write commands to write sets of writeback data to a non-volatile memory (NVM) and read commands to read sets of readback data from the NVM;
  temporarily storing the sets of writeback data in a write cache pending transfer to the NVM;
  monitoring the access commands received from the client device to detect an overlap condition in which a subsequently received access command requests a retrieval from or a transfer to the NVM of a set of data having a logical range that at least partially overlaps a logical range of a selected set of writeback data currently pending in the write cache;

adjusting a caching policy associated with the write cache responsive to the detected overlap condition, the adjusted caching policy including an action to retain the selected set of writeback data in the write cache after the selected set of writeback data have been successfully transferred to the NVM; and using the retained selected set of writeback data in the write cache to service the subsequently received access command.

2. The method of claim 1, wherein the subsequently received access command comprises an overlapping read command that requests retrieval to the client device of a set of data blocks encompassed in the selected set of writeback data, and wherein the overlapping read command is serviced by transferring a copy of the set of data blocks from the write cache to a read buffer for subsequent transfer to the client device.

3. The method of claim 1, wherein the subsequently received access command comprises an overlapping write command that requests transfer of a newer set of writeback data that partially supersedes the selected set of writeback data, and wherein the overlapping write command is serviced by combining the selected set of writeback data retained in the write cache with the newer set of writeback data to form a coalesced set of writeback data, and transferring the coalesced set of writeback data to the NVM.

4. The method of claim 3, further comprising proceeding with the transfer of the selected set of writeback data to the NVM prior to the transfer of the coalesced set of writeback data to the NVM.

5. The method of claim 1, wherein the adjusting step comprises adjusting the caching policy to increase an overall data storage capacity of the write cache.

6. The method of claim 1, wherein the write cache is provided with a baseline timing criterion that assigns a first maximum elapsed time interval to each set of writeback data so that the selected set of writeback data is transferred to the NVM prior to expiration of the first maximum elapsed time interval, and wherein the adjusting step comprises increasing the baseline timing criterion to a greater, second maximum elapsed time interval for at least selected ones of the sets of writeback data in or added to the write cache.

7. The method of claim 1, wherein the adjusting step comprises adjusting the caching policy of the write cache so that the selected set of writeback data are retained in the write cache for a selected period of time after successful transfer of the selected set of writeback data to the NVM.

8. The method of claim 1, wherein the selected set of writeback data are assigned to a target location in the NVM requiring a selected set of resources, wherein the adjusting step comprises implementing a selected delay interval during which the selected set of writeback data are retained in the write cache and not transferred to the NVM so that other sets of writeback data subsequently received into the write cache are transferred to the target location using the selected set of resources instead of the selected set of writeback data.

9. The method of claim 1, wherein the using step comprises servicing the subsequently received access command using the selected set of writeback data in the write cache prior to completion of a successful transfer of the selected set of writeback data to the NVM.

10. The method of claim 1, wherein the using step comprises servicing the subsequently received access command using the selected set of writeback data in the write cache after completion of a successful transfer of a copy of the selected set of writeback data to the NVM.

11. The method of claim 1, wherein the NVM comprises a NAND flash memory of a solid-state drive (SSD).

12. An apparatus comprising:

a non-volatile memory (NVM);

a command queue configured to accumulate access commands received from a client device, the access commands comprising write commands to write sets of writeback data to the NVM and read commands to read sets of readback data from the NVM;

a write cache configured to temporarily store the sets of writeback data pending transfer to the NVM;

a read buffer configured to temporarily store the sets of readback data pending transfer to the client device;

a controller configured to direct the servicing of the respective read and write commands in the command queue; and a cache manager configured to monitor the access commands in the command queue to detect an overlap condition between a previously received write command and a subsequently received access command, the overlap condition comprising an overlap between a logical range associated with the previously received write command and the subsequently received access command, the cache manager further configured to implement a change in caching policy for the write cache responsive to the detected overlap condition, the change in caching policy comprising retention of a set of writeback data associated with the previously received write command in the write cache until the subsequently received access command is successfully executed.

13. The apparatus of claim 12, characterized as a solid-state drive (SSD), wherein the NVM and the write cache each comprise flash memory, the read buffer comprises volatile memory, and the controller and the cache manager are realized using at least one programmable processor that executes program instructions stored in a local memory.

14. The apparatus of claim 12, wherein the subsequently received access command comprises an overlapping read command that requests retrieval to the client device of a set of data blocks encompassed in the associated set of writeback data, and wherein the overlapping read command is serviced by transferring a copy of the set of data blocks from the write cache to the read buffer for subsequent transfer to the client device.

15. The apparatus of claim 12, wherein the subsequently received access command comprises an overlapping write command that requests transfer of a newer set of writeback data that partially supersedes the associated set of writeback data, and wherein the overlapping write command is serviced by combining the associated set of writeback data retained in the write cache with the newer set of writeback data to form a coalesced set of writeback data, and transferring the coalesced set of writeback data to the NVM.

16. The apparatus of claim 12, wherein the adjusted caching policy further comprises at least a selected one of: expanding an overall size of the write cache, implementation of delays to the writing of at least one set of writeback data in the write cache, a retention of at least one set of writeback data in the write cache after successful transfer to the selected sets of writeback data to the NVM, and coalescing of multiple sets of writeback data into a combined set of writeback data.

17. The apparatus of claim 12, wherein the cache manager adjusts the caching policy of the write cache so that the associated set of writeback data are retained in the write cache for a selected period of time after successful transfer of the associated set of writeback data to the NVM.

18. The apparatus of claim 12, wherein the cache manager comprises an overlapping read monitor circuit configured to detect a rate at which overlapping read conditions are provided by the client device, to compare the detected rate to a first predetermined threshold, and to provide a notification to a command manager circuit of the cache manager of a presence of an overlapping read condition responsive to the detected rate meeting or exceeding the first predetermined threshold, the cache manager adjusting the caching policy of the write cache responsive to the notification, each overlapping read condition comprising receipt of a subsequent read command that at least partially overlaps a previously received and pending write command.

19. The apparatus of claim 18, wherein the cache manager further comprises an overlapping write monitor circuit configured to detect a second rate at which overlapping write conditions are provided by the client device, to compare the detected second rate to a second predetermined threshold, and to provide a second notification to a command manager circuit of the cache manager of a presence of an overlapping write condition responsive to the detected rate meeting or exceeding the second predetermined threshold, the cache manager adjusting the caching policy of the write cache responsive to the second notification, each overlapping write condition comprising receipt of a subsequent write command that at least partially overlaps a previously received and pending write command.

20. The apparatus of claim 12, wherein the associated set of writeback data are assigned to a target location in the NVM requiring a selected set of resources, wherein the cache manager implements a selected delay interval during which the associated set of writeback data are retained in the write cache and not transferred to the NVM so that other sets of writeback data subsequently received into the write cache are transferred to the target location using the selected set of resources instead of the selected set of writeback data, wherein the cache manager further proceeds to direct a transfer of the associated set of writeback data to the NVM after a conclusion of the delay interval, and wherein the cache manager further proceeds to direct retention of a copy of the associated set of writeback data in the write cache after completion of the transfer of the selected set of writeback data to the NVM to service subsequent overlapping commands.

* * * * *